(12) United States Patent
Cannon et al.

(10) Patent No.: US 7,694,428 B2
(45) Date of Patent: Apr. 13, 2010

(54) MEASURING DEVICE

(75) Inventors: Michael G. Cannon, 637 Walnut La., Haverford, PA (US) 19041; Michael J. Filippone, Jr., Northport, NY (US)

(73) Assignee: Michael G. Cannon, Haverford, PA (US)

(*) Notice: Subject to any disclaimer, the term of this patent is extended or adjusted under 35 U.S.C. 154(b) by 129 days.

(21) Appl. No.: 11/872,271

(22) Filed: Oct. 15, 2007

(65) Prior Publication Data
US 2009/0094850 A1 Apr. 16, 2009

(51) Int. Cl.
*G01B 3/14* (2006.01)
*A63B 59/02* (2006.01)

(52) U.S. Cl. .................. 33/562; 33/1 BB; 33/501.09

(58) Field of Classification Search .............. 33/501, 33/501.05, 501.08, 501.09, 501.1, 501.3, 33/501.45, 501.5, 562, 700, 759, 1 BB
See application file for complete search history.

(56) References Cited

U.S. PATENT DOCUMENTS

| | | | | |
|---|---|---|---|---|
| 741,146 A * | 10/1903 | Labofish | ................... | 33/562 |
| 1,157,514 A * | 10/1915 | Earl | ............................ | 33/460 |
| 1,380,187 A * | 5/1921 | Brose | .......................... | 33/562 |
| 1,601,138 A * | 9/1926 | Moore | ......................... | 33/462 |
| 3,389,474 A * | 6/1968 | Linn | ........................... | 33/479 |
| 4,527,341 A * | 7/1985 | Schon | .......................... | 33/455 |
| 5,461,798 A * | 10/1995 | Ribeiro | ....................... | 33/562 |
| 6,926,627 B1 | 8/2005 | LeMire et al. | .............. | 473/513 |
| 7,373,727 B2 * | 5/2008 | Bruce | ........................... | 33/455 |
| 7,503,126 B2 * | 3/2009 | Robins | ........................ | 33/613 |
| 2001/0046908 A1 * | 11/2001 | Loomis et al. | .............. | 473/451 |
| 2008/0229600 A1 * | 9/2008 | Laitta et al. | ................... | 33/700 |

* cited by examiner

*Primary Examiner*—R. A. Smith
(74) *Attorney, Agent, or Firm*—Woodcock Washburn LLP

(57) ABSTRACT

A measuring device for determining compliance of a lacrosse stick is disclosed. The measuring device will make it easier and quicker for a user to check the compliance. The device may make it possible for a user to check multiple dimensions of a lacrosse stick at one time. For example, such a measuring device may be adapted to measure a first width, a second width, and a length of the lacrosse stick head.

16 Claims, 6 Drawing Sheets

MEASURING DEVICE

FIELD OF THE INVENTION

Generally, the invention relates to measuring devices. More particularly, the invention relates to a measuring device for measuring the head of a lacrosse stick.

BACKGROUND OF THE INVENTION

For years, the NCAA and various other lacrosse leagues have required that lacrosse sticks adhere to certain dimensional requirements. The rules have prevented lacrosse players from obtaining a competitive advantage by specifying minimum and maximum stick dimensions. Unfortunately, the current rules have done little to prevent the players from obtaining such a competitive advantage, and if anything, have promoted more dangerous activities on the field. For example, defenders will wind up and strike at the stick of an attacker in an attempt to dislodge the ball, only to see the ball carrier continue cradling the ball. In other words, because of the current minimum dimensions requirement of the lacrosse stick heads, it is too easy for a ball carrier to maintain possession of the ball, thereby diminishing the integrity of the game and forcing defenders to increase the brutality of their tactics.

To bring integrity back to the game, the NCAA has proposed a rule change that will require new dimensions for lacrosse stick heads. The new rule will require:

1. The measurement at the widest part of the crosse shall be a minimum of 6.5 inches measured at the front of the crosse and a minimum of 6 inches at the back of the crosse;
2. The measurement up from the stop to the 5-inch mark may not be less than 4.25 inches at the front and back of the crosse;
3. The measurement up from the stop to the 3-inch mark may not be less than 3.25 inches at the front and back of the crosse; and
4. The measurement up from the stop to the 1.25-inch mark may not be less than 2.75 inches at the front and back of the crosse.

As any game official, player, retailer, and manufacturer can appreciate, checking a lacrosse stick head against dimensional requirements can be a difficult task; especially, when multiple measurements are required. For example, if the rules required the above dimensional requirements, an official will have to conduct the following procedure to ensure that a stick head complies with such rules:

1. Measure the front of the crosse at the widest part of the head to ensure that it is no less than 6.5 inches wide.
2. Measure the back of the crosse at the widest part of the head to ensure that is no less than 6.0 inches wide.
3. Measure 5 inches up from the stop and then measure the width to ensure that it is no less than 4.25 inches wide.
4. Measure 3 inches up from the stop and then measure the width to ensure that it is no less than 3.25 inches wide.
5. Measure 1.25 inches up from the stop and then measure the width to ensure that it is no less than 2.75 inches wide.

As can be imagined, such a task or procedure would be daunting. Accordingly, it may be desired by officials, retailers, or even manufacturers to have a device capable of checking the dimensions of a lacrosse stick head, to ensure that it complies with the rules.

SUMMARY OF THE INVENTION

A measuring device for determining compliance of a lacrosse stick is disclosed. The measuring device will make it easier and quicker for a user to check the compliance. The device may make it possible for a user to check multiple dimensions of a lacrosse stick at one time. For example, such a measuring device may be adapted to measure a first width, a second width, and a length of the lacrosse stick head.

In one example embodiment, the device may comprise a first member, a second member, a third member, a fourth member, and a fifth member. The first member may be capable of extending at least a portion of a length of the lacrosse stick head. The second member may be coupled to a first portion of the first member, and may be adapted to measure a first width of the lacrosse stick head. The third member may be coupled to a second portion of the first member, and may be adapted to measure a second width of the lacrosse stick head. The fourth member may be coupled to a third portion of the first member, and may be adapted to measure a third width of the lacrosse stick head. The fifth member may be coupled to a fourth portion of the first member, and may be adapted to measure a fourth width of the lacrosse stick head. The first, second, third, fourth, and fifth members may be capable of collapsing into a housing.

In another example embodiment, the measuring device may comprise a member, a first set of arms, and a second set of arms. The member may have a length. The first set of arms may be rotatably coupled to a first portion of the member, and may be adapted to measure a first minimum width of the lacrosse stick head. The second set of arms may be rotatably coupled to a second portion of the member, and may be adapted to measure a second minimum width of the lacrosse stick head. The member, first set of arms, and second set of arms may be capable of collapsing into a housing.

In another example embodiment, the measuring device may comprise a housing, a first member, a second member, a third member, and a fourth member. The first member may extend from a first side of the housing. The second member may be coupled to a first portion of the first member, and may be adapted to measure a first width of the lacrosse stick head. The third member may be coupled to a second portion of the first member, and may be adapted to measure a second width of the lacrosse stick head. The fourth member may extend from a second side of the housing, and may be adapted to measure a length of a lacrosse stick. The first, second, third, and fourth members may be capable of collapsing into the housing.

DETAILED DESCRIPTION OF ILLUSTRATIVE EMBODIMENTS

Figure 1:
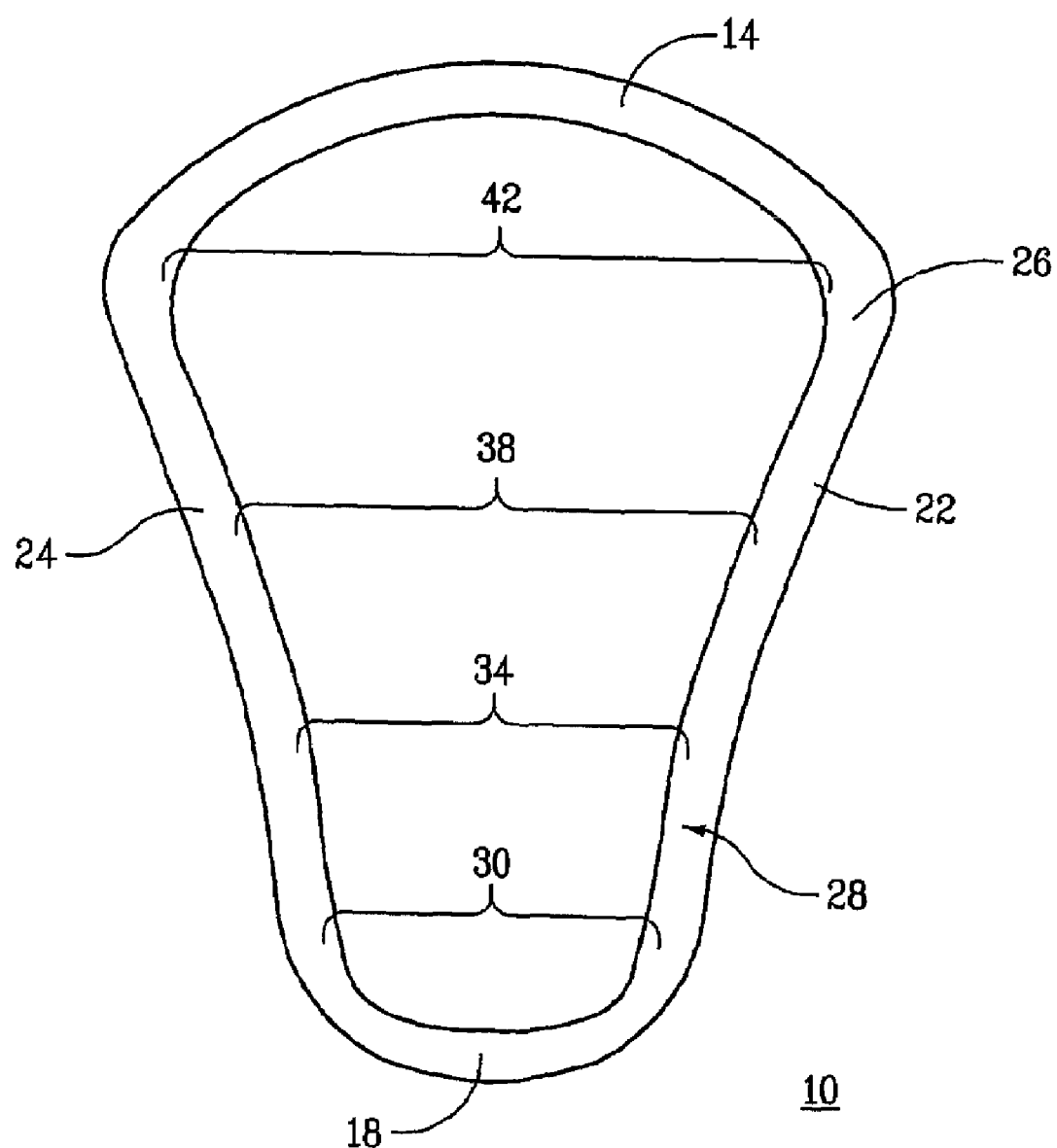
FIG. 1 is a front view of an example lacrosse stick head.

FIG. 1 depicts an illustration of an example lacrosse stick head 10. The lacrosse stick head 10 may include a scoop 14, a stop 18, and two side walls 22 and 24. Each side wall 22 and 24 may merge with the scoop 14 and the stop 18 thereby defining a rim 26. The rim 26 includes a front portion 28 and a bottom portion (not shown). Typically the rim 26 is made of plastic, however, it may also be made of other materials, such as wood. The rim 26 may be strung with mesh or leathers and nylon strings to form a pocket. Such lacrosse stick heads 10 are required to adhere to certain dimensional requirements. For example, the lacrosse stick head 10 may be required to have a minimum width at a first portion 30 of the rim 26, a minimum width at a second portion 34 of the rim 26, a minimum width at a third portion 38 of the rim 26, and a minimum width at a fourth portion 42 of the rim 26.

The proposed rule change provides specific points and dimensions to be measured on the lacrosse stick head 10. For example, the first portion 30 may be measured 1.25 inches up from the stop 18, and may be limited to a minimum width of 2.75 inches at the front 28 and back of the rim 26. The second portion 34 may be measured 3.0 inches up from the stop 18, and may be limited to a minimum width of 3.25 inches at the front 28 and back of the rim 26. The third portion 38 may be measured 5.0 inches up from the stop 18, and may be limited to a minimum width of 4.25 inches at the front 28 and back of the rim 26. The fourth portion 42 may be located at the widest part of the rim 26 and may be limited to a minimum width of 6.5 inches at the front 28 of the rim 26 and a minimum width of 6.0 inches at the back of the rim 26. Note that these dimensions are subject to change and are not limited to those provided in the proposed rule change. For example, the rules may not require four portions of the lacrosse stick head 10 to have specified minimum widths, and/or the specific numbers provided may be different.

Disclosed is a measuring device for checking the compliance of a lacrosse stick head. In some embodiments, the measuring device may make it easier and quicker for a user to check the compliance. For example, the device may be carried by a referee during a game, and may be pulled out and used at any moment.

Figure 2:
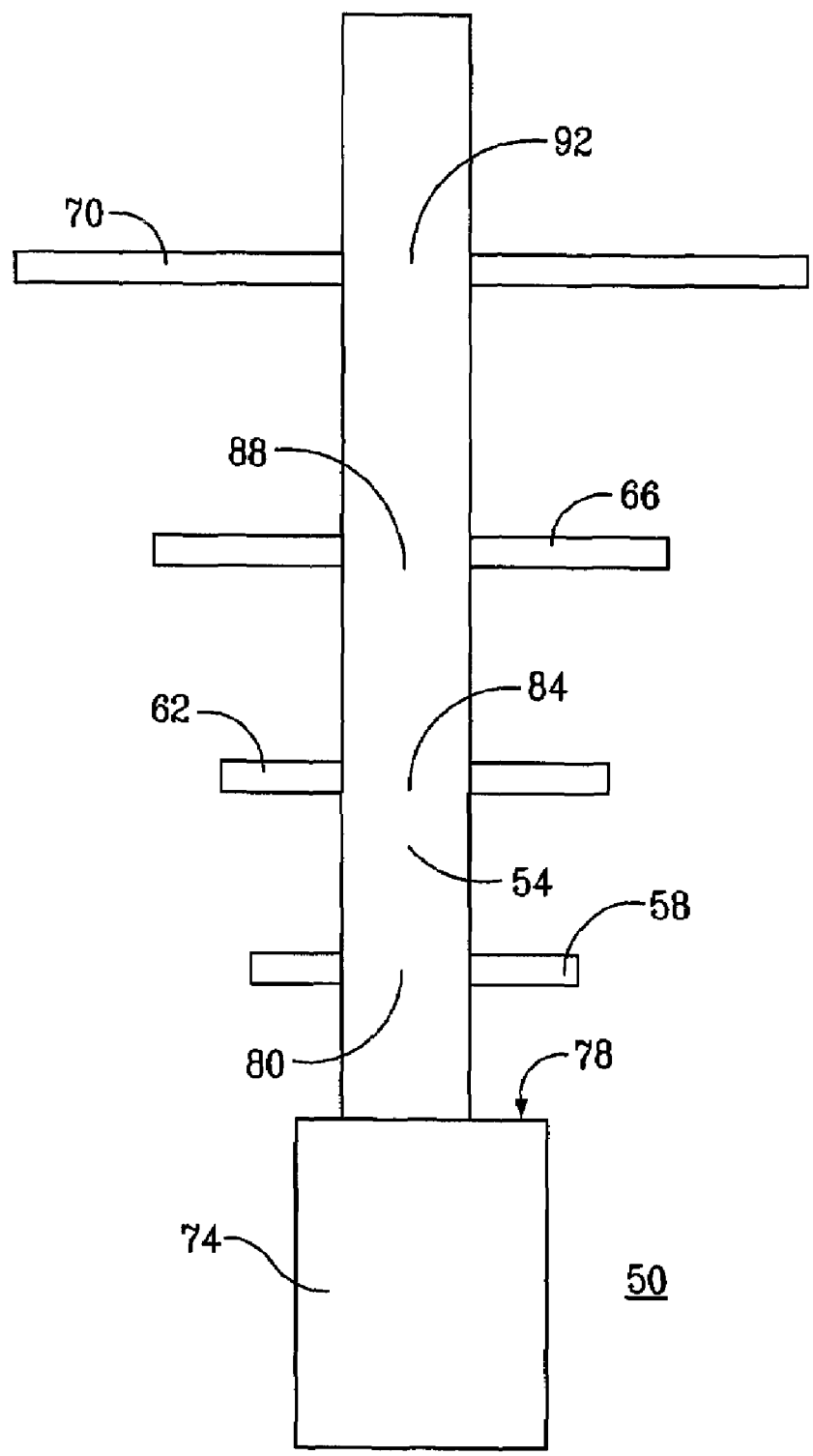
FIG. 2 is a front view of an example embodiment of a measuring device.
Figure 3:
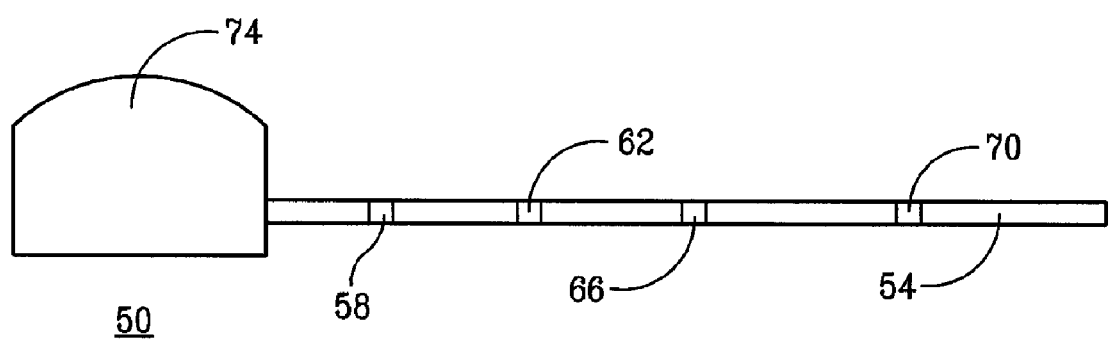
FIG. 3 is a side view of the measuring device of FIG. 2.

FIGS. 2 and 3 depict an example embodiment of the measuring device capable of checking the compliance of a lacrosse stick head. As shown in FIGS. 2 and 3, a measuring device 50 may include a first member 54, a second member 58, a third member 62, a fourth member 66, a fifth member 70, and a housing 74. The first member 54 may extend in a first direction from a first side 78 of the housing 74. The second member 58, third member 62, fourth member 66, and fifth member 70 may each extend from the first member 54 in a second direction. As depicted, the second direction may be substantially perpendicular to the first direction. It should be understood that the device 50 is not limited to such structures. For example, in other embodiments, the device 50 may be a single member having several different widths at different points along the member.

It should be appreciated that the device 50 may be manufactured a number of different ways. For example, the first, second, third, fourth, and fifth members 54, 58, 62, 66, and 70 may be part of a single molded unit and/or may each be separate parts connected together to form the completed device. Also, the device 50 may have parts stamped out of a sheet of metal.

The first member 54 may be made of a resilient material, such as metal or plastic, for example. The first member 54 may be collapsible, thereby perhaps allowing it to be collapsed into the housing 74. The first member 54 may include measurement markings such as markings for English units and/or metric units to enable a user to make accurate measurements. For example, a user may want to measure the length of a lacrosse stick head, or measure a specific distance up from the stop 18 of the lacrosse stick head 10. The first member 54 may also be extendable. For example, the first member 54 may be able to extend the entire length of a lacrosse stick.

As shown in FIG. 2, the second member 58 may extend from a first portion 80 of the first member 54. The second member 58 may be made of a resilient material, such as metal or plastic, for example. The second member 58 may be collapsible, thereby allowing it to be collapsed into the housing 74 along with the first member 54.

Figure 4:
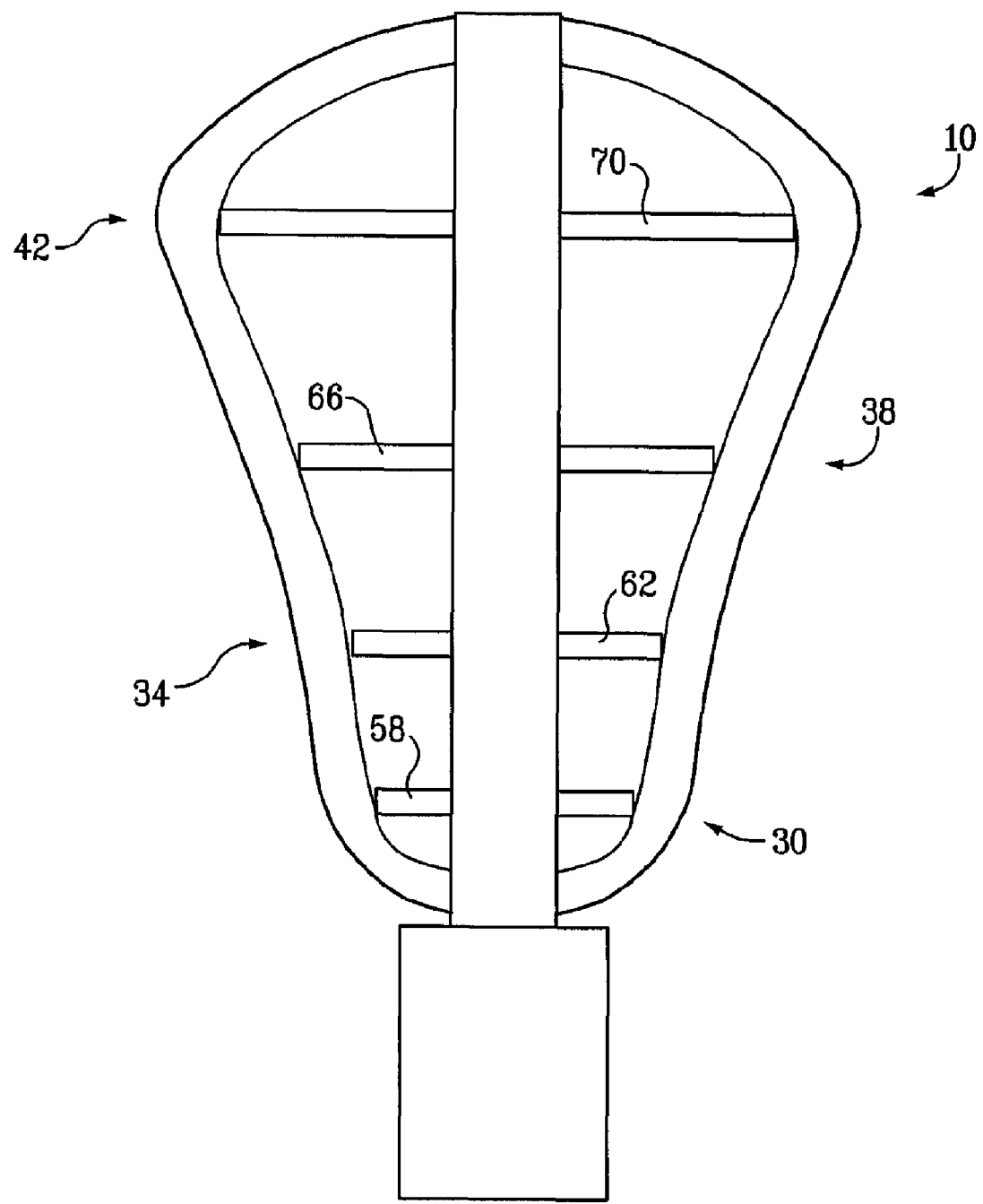
FIG. 4 is a front view of the measuring device of FIG. 2 being used to measure the lacrosse stick head of FIG. 1.

FIG. 4 is a front view of the measuring device 50 measuring the lacrosse stick head 10. As shown in FIG. 4, the second member 58 may be adapted to determine compliance of the first portion 30 of the lacrosse stick head 10. That is, the second member 58 may be adapted to measure the width of the first portion 30 of the lacrosse stick head 10. For example, if the minimum width of the first portion 30 of the lacrosse stick head 10 is 2.75 inches, then the total length of the second member 58 may be 2.75 inches. Additionally, the second member 58 may include measurement markings such as markings for English units and/or metric units to make it even easier for a user to determine the compliance of the first portion 30 of the lacrosse stick head 10. Although not shown in FIG. 4, it should be appreciated that the second member 58 may have a length that is greater than the minimum width of the first portion 30.

As shown in FIG. 2, the third member 62 may extend from a second portion 84 of the first member 54. The third member 62 may be made of a resilient material, such as metal or plastic, for example. The third member 62 may be collapsible, thereby allowing it to be collapsed into the housing 74 along with the first member 54 and second member 58.

As shown in FIG. 4, the third member 62 may be adapted to determine compliance of the second portion 34 of the lacrosse stick head 10. That is, the third member 62 may be adapted to measure the width of the second portion 34 of the lacrosse stick head 10. For example, if the minimum width of the second portion 34 of the lacrosse stick head 10 is 3.25 inches, then the total length of the third member 62 may be 3.25 inches. Additionally, the third member 62 may include measurement markings such as markings for English units and/or metric units for a user to determine the compliance of the second portion 34 of the lacrosse stick head 10. Although not shown in FIG. 4, it should be appreciated that the third member 62 may have a length that is greater than the minimum width of the second portion 34.

As shown in FIG. 2, the fourth member 66 may extend from a third portion 88 of the first member 54. The fourth member 66 may be made of a resilient material, such as metal or plastic, for example. The fourth member 66 may be collapsible, thereby allowing it to be collapsed into the housing 74 along with the first member 54, second member 58, and third member 62.

As shown in FIG. 4, the fourth member 66 may be adapted to determine compliance of the third portion 38 of the lacrosse stick head 10. That is, the fourth member 66 may be adapted to measure the width of the third portion 38 of the lacrosse stick head 10. For example, if the minimum width of the third portion 38 of the lacrosse stick head 10 is 4.25 inches, then the total length of the fourth member 66 may be 4.25 inches. Additionally, the fourth member 66 may include measurement markings such as markings for English units and/or metric units for a user to determine the compliance of the third portion 38 of the lacrosse stick head 10. Although not shown in FIG. 4, it should be appreciated that the fourth member 66 may have a length that is greater than the minimum width of the third portion 38.

As shown in FIG. 2, the fifth member 70 may extend from a fourth portion 92 of the first member 54. The fifth member 70 may be made of a resilient material, such as metal or plastic, for example. The fifth member 70 may be collapsible, thereby allowing it to be collapsed into the housing 74 along with the first member 54, second member 58, third member 62, and fourth member 66. Additionally, the fifth member 70 may be adjustable along the first direction. For example, the fifth member 70 may be slidably coupled to the first member 54, so that a user can manually move the fifth member 70 up or down the first member 54.

As shown in FIG. 4, the fifth member 70 may be adapted to determine compliance of the fourth portion 42 of the lacrosse stick head 10. That is, the fifth member 70 may be adapted to measure the width of the fourth portion 42 of the lacrosse stick head 10. For example, if the minimum width of the fourth portion 42 of the lacrosse stick head 10 is 6.5 inches, then the total length of the fifth member 70 may be 6.5 inches. Additionally, the fifth member 70 may include measurement markings such as markings for English units and/or metric units to make it even easier for a user to determine the compliance of the fourth portion 42 of the lacrosse stick head 10. Although not shown in FIG. 4, it should be appreciated that the fifth member 70 may have a length that is greater than the minimum width of the fourth portion 42.

When the first, second, third, fourth, and fifth members 54, 58, 62, 66, and 70 are collapsed, they may be contained in the housing 74. The housing 74 may be made of a resilient material such as plastic or metal for example. The housing 74 may designed to fit in the pocket of a user of the device. For example, the housing 74 may be shaped like a wallet. It should be appreciated, that the housing 74 is not limited to the design described and that other features or designs may be used.

The housing 74 may include a writing utensil holder (not shown). The writing utensil holder may be any design capable of holding a pen or pencil. For example, the writing utensil holder may be a slot or a clip.

The housing 74 may also include a score card holder (not shown). The score card holder may be any design capable of holding a score card. For example, the score card holder may be a slot, a single clip, or multiple clips. Preferably, the score card may be attached to an exterior surface of the housing 74, thereby making the surface of the housing 74 a surface for the user to write on.

Figure 5:
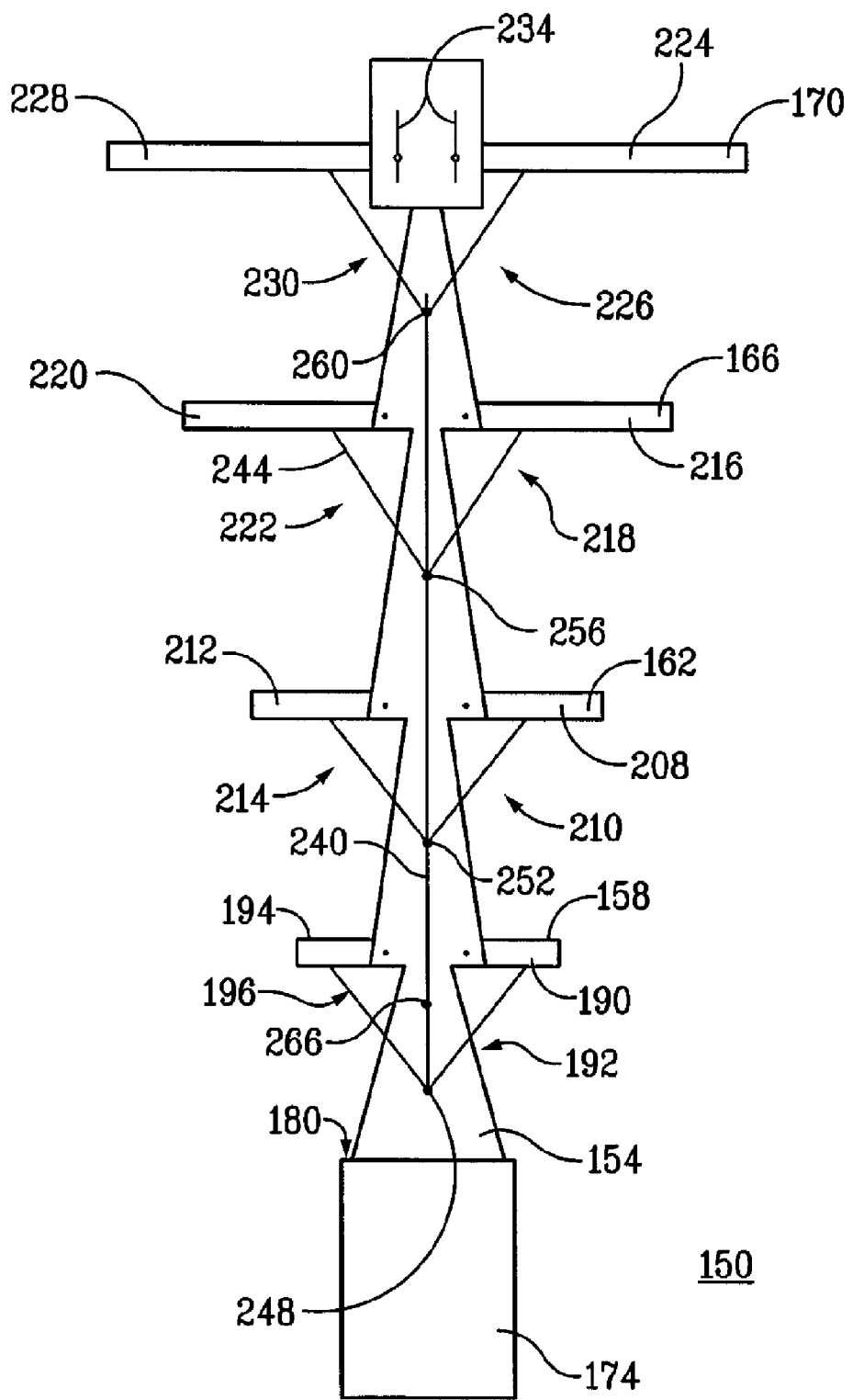
FIG. 5 is a front view of another example embodiment of a measuring device.

FIG. 5 depicts another example embodiment of the measuring device. As shown in FIG. 5, a measuring device 150 may include, a member 154, a first set of arms 158, a second set of arms 162, a third set of arms 166, a fourth set of arms 170, and a housing 174.

As shown, the member 154 may extend from a first side 180 of the housing 174. The member 154 may be made from a resilient material such as metal or plastic for example. The member 154 may include measurement markings such as markings for English units and/or metric units to enable a user to make certain measurements. For example, a user may want to measure the length of the lacrosse stick head, or measure a specific distance up from the stop 18 of the lacrosse stick head 10.

The member 154 may be extendable and collapsible. That is, the member 154 may be able to extend beyond the length of the lacrosse stick head, such that a user may be able to measure the entire length of the lacrosse stick. Additionally, the member 154 may be able to collapse into the housing 174. Therefore, a user may be able to store the measuring device 150 in his or her pocket.

The first set of arms 158 may include a first arm 190 and a second arm 194. Each arm 190 and 194 may be made from a resilient material such as metal or plastic for example. Each arm 190 and 194 may be rotatably coupled to the member 154. As shown in FIG. 5, the first arm 190 may be pinned to the member 154 and may rotate counterclockwise from a rested position in a recess 192 of the member 154 to an extended position. The second arm 194 may also be pinned to the member 154, and may rotate clockwise from a rested position in a recess 196 of the member 154 to an extended position. The measuring device 150 is not limited to using pins to couple the first set of arms 158 to the member 154. For example, the first arm 190 and the second arm 194 may also be hinged to the member 154. Additionally, the arms 190 and 194 are not limited to the described rotation. For example the arms may rotate in different directions.

The first set of arms 158 may be adapted to determine compliance of the first portion 30 of the lacrosse stick head 10 shown in FIG. 1. That is, when the first set of arms 158 are fully extended, they may be adapted to measure the width of the first portion 30 of the lacrosse stick head 10. For example, if the minimum width of the first portion 30 of the lacrosse stick head 10 is 2.75 inches, then the total length of the first set of arms 158 may be 2.75 inches measured from the tip of the first arm 190 to the tip of the second arm 194. Additionally, the first set of arms 158 may include measurement markings such as markings for English units and/or metric units for a user to determine the compliance of the first portion 30 of the lacrosse stick head 10.

The second set of arms 162 may include a first arm 208 and a second arm 212. Each arm 208 and 212 may be made from a resilient material such as metal or plastic for example. Each arm 208 and 212 may be rotatably coupled to the member 154. As shown in FIG. 5, the first arm 208 may be pinned to the member 154 and may rotate counterclockwise from a rested position in a recess 210 of the member 154 to an extended position. The second arm 212 may also be pinned to the member 154, and may rotate clockwise from a rested position in a recess 214 of the member 154 to an extended position. The measuring device 150 is not limited to using pins to couple the second set of arms 162 to the member 154. For example, the first arm 208 and the second arm 212 may also be hinged to the member 154. Additionally, the arms 208 and 212 are not limited to the described rotation. For example the arms may rotate in different directions.

The second set of arms 162 may be adapted to determine compliance of the second portion 34 of the lacrosse stick head 10 shown in FIG. 1. That is, when the second set of arms 162 are fully extended, they may be adapted to measure the width of the second portion 34 of the lacrosse stick head 10. For example, if the minimum width of the second portion 34 of the lacrosse stick head 10 is 3.25 inches, then the total length of the second set of arms 162 may be 3.25 inches measured from the tip of the first arm 208 to the tip of the second arm 212. Additionally, the second set of arms 162 may include measurement markings such as markings for English units and/or metric units to make it even easier for a user to determine the compliance of the second portion 34 of the lacrosse stick head 10.

The third set of arms 166 may include a first arm 216 and a second arm 220. Each arm 216 and 220 may be made from a resilient material such as metal or plastic for example. Each arm 216 and 220 may be rotatably coupled to the member 154. As shown in FIG. 5, the first arm 216 may be pinned to the member 154 and may rotate counterclockwise from a rested position in a recess 218 of the member 154 to an extended position. The second arm 220 may also be pinned to the member 154, and may rotate clockwise from a rested position in a recess 222 formed in the member 154 to an extended position. The measuring device 150 is not limited to using pins to couple the third set of arms 166 to the member 154. For example, the first arm 216 and the second arm 220 may also be hinged to the member 154. Additionally, the arms 216 and 220 are not limited to the described rotation. For example the arms may rotate in different directions.

The third set of arms 166 may be adapted to determine compliance of the third portion 38 of the lacrosse stick head 10 shown in FIG. 1. That is, when the third set of arms 166 are fully extended, they may be adapted to measure the width of the third portion 38 of the lacrosse stick head 10. For example, if the minimum width of the third portion 38 of the lacrosse stick head 10 is 4.25 inches, then the total length of the third set of arms 166 may be 4.25 inches measured from the tip of the first arm 216 to the tip of the second arm 220. Additionally, the third set of arms 166 may include measurement markings such as markings for English units and/or metric units for a user to determine the compliance of the third portion 38 of the lacrosse stick head 10.

The fourth set of arms 170 may include a first arm 224 and a second arm 228. Each arm 224 and 228 may be made from a resilient material such as metal or plastic for example. Each arm 224 and 228 may be rotatably coupled to the member 154. As shown in FIG. 5, the first arm 224 may be pinned to the member 154 and may rotate counterclockwise from a rested position in a recess 226 of the member 154 to an extended position. The second arm 228 may also be pinned to the member 154, and may rotate clockwise from a rested position in a recess 230 of the member 154 to an extended position. The measuring device 150 is not limited to using pins to couple the fourth set of arms 170 to the member 154. For example, the first arm 224 and the second arm 228 may also be hinged to the member 154. Additionally, the arms 224 and 228 are not limited to the described rotation. For example the arms may rotate in different directions.

The fourth set of arms 170 may also be slidably connected to the member 154. As shown in FIG. 5, the member 154 may include slots 234 and the arms 224 and 228 may be pinned or otherwise attached to the slots 234 such that a user may be capable of moving the arms 224 and 228 along the member 154.

The fourth set of arms 170 may be adapted to determine compliance of the fourth portion 42 of the lacrosse stick head 10 shown in FIG. 1. That is, when the fourth set of arms 170 are fully extended, they may be adapted to measure the width of the fourth portion 42 of the lacrosse stick head 10. For example, if the minimum width of the fourth portion 42 of the lacrosse stick head 10 is 6.5 inches, then the total length of the fourth set of arms 170 may be 6.5 inches measured from the tip of the first arm 224 to the tip of the second arm 228. Additionally, the fourth set of arms 170 may include measurement markings such as markings for English units and/or metric units for a user to determine the compliance of the fourth portion 42 of the lacrosse stick head 10.

Each set of arms of the measuring device 150 may be simultaneously opened up into a fully extended position by the user. As depicted, the member 154 may include a track 240, and each arm may be coupled to the track 240 by a connector member 244. As shown, the connector members 244 of the first set of arms 158 may be slidably connected to the track 240 by a first pin 248, the connector members 244 of the second set of arms 162 may be slidably connected to the track 240 by a second pin 252, the connector members 244 of the third set of arms 166 may be slidably connected to the track 240 by a third pin 256, and the connector members of the fourth set of arms 170 may be slidably connected to the track 240 by a fourth pin 260. Each of the pins may be connected in a way that enables each set of arms to be opened at the same time. In the embodiment depicted, a user may push up on a fifth pin 266, thereby causing the first 248, second 252, third 256, and fourth 260 pins to move up along the track 240 and ultimately open up the arms. Once the arms are fully extended, the fifth pin 266 may lock into place. Additionally, each arm may include a compression spring. Therefore, when the member 154 is pulled out from the housing 174, the springs may compress and pull each arm into its extended position.

Figure 6:
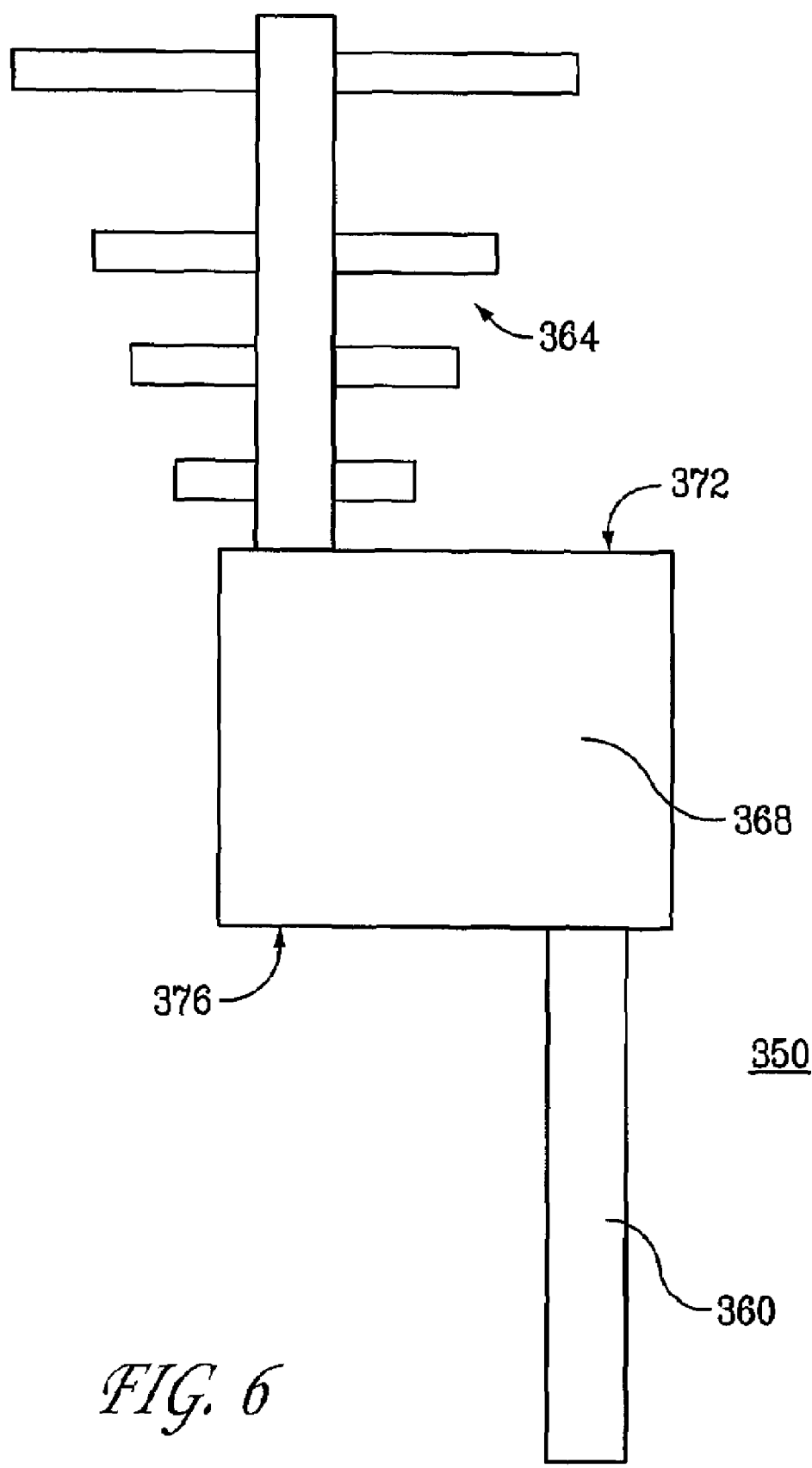
FIG. 6 is a front view of another example embodiment of a measuring device.

The measuring device may also include a handle measuring member. For example, FIG. 6 depicts a measuring device 350 having a handle measuring member 360. As shown, the device may also include a stick head measuring member 364 and a housing 368. The stick head measuring member 364 may extend from a first side 372 of the housing 368, and the handle measuring member 360 may extend from a second side 376 of the housing 368.

The stick head measuring member 364 may be adapted to measure the compliance of the lacrosse stick head 10 shown in FIG. 1. For example the stick head measuring member 364 may be adapted to measure the width of the first portion 30, the second portion 34, the third portion 38 and the fourth portion 42 of the rim 26 of the lacrosse stick head 10. The stick head measuring member 364 may also be collapsible. For example, the stick head measuring member 364 may collapse into the housing 368.

The handle measuring member 360 may be adapted to measure the compliance of the lacrosse stick handle (or stick length). For example, the handle measuring member 360 may extend the entire length of the stick handle. The handle measuring member 360 may also be collapsible. For example, the handle measuring member 360 may collapse into the housing 368.

The measuring device may also be capable of measuring the depth of the lacrosse stick head's pocket. For example, the measuring device may include a pocket depth member that may be adapted to extend into the pocket to determine compliance of the stick head's pocket.

The measuring device may also include a motor. The motor may be used to help extend the measuring members out from the housing. In embodiments that have rotatable members, the motor may also aid in the rotation of such members into their fully extended positions. Preferably, the housing would include a button or switch that is capable of turning the motor on and off.

The measuring device may also be in "tape measure form." That is, the device may extend and retract like a standard tape measure. Also like a tape measure, the measuring device may be easily carried in a user's pocket or on a user's belt. For example, a referee may want to have the device easily accessible during a game, or a manufacturer may want the device accessible while walking through a manufacturing facility.

What is claimed:

1. A measuring device for determining compliance of a lacrosse stick head, the measuring device comprising:
   a first member capable of extending at least a portion of a length of the lacrosse stick head;
   a second member coupled to a first portion of the first member;
   a third member coupled to a second portion of the first member;

a fourth member coupled to a third portion of the first member; and a fifth member coupled to a fourth portion of the first member, wherein the second member is adapted to measure a first width of the lacrosse stick head, the third member is adapted to measure a second width of the lacrosse stick head, the fourth member is adapted to measure a third width of the lacrosse stick head, and the fifth member is adapted to measure a fourth width of the lacrosse stick head.

2. The measuring device of claim 1, further comprising a housing, wherein the first, second, third, fourth, and fifth members are adapted to collapse into the housing.

3. The measuring device of claim 1, wherein the first member defines a ruler adapted to measure the length of the lacrosse stick head.

4. The measuring device of claim 1, wherein the first width, the second width, the third width, and the fourth width define minimum widths.

5. The measuring device of claim 1, wherein the first member is adjustable, such that the first member is adapted to measure an entire length of a lacrosse stick.

6. The measuring device of claim 1, wherein the second member is 2.75 inches long, the third member is 3.25 inches long, the fourth member is 4.25 inches long, and the fifth member is 6.5 inches long.

7. The measuring device of claim 1, wherein the second member of the measuring device is adapted to extend out from the first member of the measuring device at a point 1.25 inches from a stop member of the lacrosse stick head, the third member of the measuring device is adapted to extend out from the first member of the measuring device at a point 3 inches from the stop member of the lacrosse sick head, and the fourth member of the measuring device is adapted to extend out from the first member of the measuring device at a point 5 inches front the stop member of the lacrosse stick head.

8. The measuring device of claim 1, wherein the second, third, fourth, and fifth member is collapsible.

9. The measuring device of claim 1, wherein the first member is collapsible.

10. The measuring device for determining compliance of a lacrosse stick head, the measuring device comprising:
a member having a length;
a first set of arms rotatably coupled to a first portion of the member, the first set of arms adapted to measure a first minimum width of the lacrosse stick head; and
a second set of arms rotatably coupled to a second portion of the member, the second set of arms adapted to measure a second minimum width of the lacrosse sick head.

11. The measuring device of claim 10, further comprising a third set of arms rotatably coupled to a third portion of the member, the third set of arms adapted to measure a third minimum width of the lacrosse stick head.

12. The measuring device of claim 11, further comprising a fourth set of arms rotatably coupled to a fourth portion of the member, the fourth set of arms adapted to measure a fourth minimum width of the lacrosse stick head.

13. The measuring device of claim 12, wherein the first minimum width is 2.75 inches, the second minimum width is 3.25 inches, the third minimum width is 4.25 inches, and the fourth minimum width is 6.5 inches.

14. The measuring device of claim 12, wherein (i) the member includes a track, (ii) the first, second, third, and fourth set of arms are each slidably coupled to the track by connector members, and (iii) when the connector members slide down the track each arm of the first, second, third, and fourth set of arms rotates about the first member.

15. The measuring device of claim 10, further comprising a housing, wherein the member, and the first and second set of arms are adapted to collapse into the housing.

16. A measuring device for determining compliance of a lacrosse stick head, the measuring device comprising:
a housing;
a first member extending from a first side of the housing;
a second member coupled to a first portion of the first member, the second member being adapted to measure a first width of the lacrosse stick head;
a third member coupled to a second portion of the first member, the third member being adapted to measure a second width of the lacrosse stick head; and
a fourth member extending from a second side of the housing, the fourth member being adapted to measure a length of a lacrosse stick,
wherein, the first, second, third, and fourth members are capable of collapsing into the housing.

* * * * *